United States Patent [19]
Collot
[11] Patent Number: 4,754,374
[45] Date of Patent: Jun. 28, 1988

[54] DIPPED HEADLIGHT PROVIDING AN OFFSET BRIGHT SPOT WITHOUT USING A MASK

[75] Inventor: Patrice Collot, Pantin, France
[73] Assignee: Cibie Projecteurs, France

[21] Appl. No.: 53,312
[22] Filed: May 22, 1987
[30] Foreign Application Priority Data
May 26, 1986 [FR] France ................................ 86-07461
[51] Int. Cl.[4] ................................................ B60Q 1/04
[52] U.S. Cl. ......................................... 362/61; 362/80; 362/308; 362/309; 362/346
[58] Field of Search ................... 362/61, 308, 309, 80, 362/297, 346, 347, 348, 349, 350

[56] References Cited

U.S. PATENT DOCUMENTS

| | | | |
|---|---|---|---|
| 4,494,176 | 1/1985 | Sands et al. | 362/309 |
| 4,506,315 | 3/1985 | Maekawa et al. | 362/61 |
| 4,530,042 | 7/1985 | Cibie et al. | 362/61 |
| 4,607,318 | 8/1986 | Lindae et al. | 362/309 |

FOREIGN PATENT DOCUMENTS

| | | |
|---|---|---|
| 656721 | 1/1965 | Belgium . |
| 921474 | 11/1980 | Fed. Rep. of Germany . |
| 1400370 | 4/1965 | France . |

*Primary Examiner*—Ira S. Lazarus
*Assistant Examiner*—Sue Hagarman

[57] ABSTRACT

A dipped headlight for a motor vehicle, capable of generating a dipped beam situated beneath a generally horizontal cutoff, the headlight being of the type comprising a lamp having an axial filament (100) emitting light freely in all directions thereabout, a reflector (200) having an axis (Ox) extending beneath the axis of the filament and parallel thereto, said reflector also including a surface without discontinuity, and said headlight further including a closure glass placed in front of the reflector and suitable for spreading said beam in a horizontal direction, said headlight including the improvement whereby the reflector includes two diametrically opposite first quadrants (201, 202) whose surfaces are at least approximately two portions of paraboloids having focuses situated in the vicinity of respective axial ends of the filament in order to generate filament images which provide light concentration situated beneath the cutoff and offset sideways relative to the headlight axis, with the other two quadrants (203, 204) being constituted by surfaces providing smooth and continuous transitions between said first two quadrants and creating filament images which are situated for the most part below the cutoff.

5 Claims, 4 Drawing Sheets

DIPPED HEADLIGHT PROVIDING AN OFFSET BRIGHT SPOT WITHOUT USING A MASK

The present invention relates to a dipped headlight for motor vehicles, in which the light beam is situated below a cutoff limit defined by two horizontal half planes which are at slightly different heights from each other.

BACKGROUND OF THE INVENTION

This type of cutoff, which is described, for example, in U.S. Pat. No. 3,858,040, is specifically adapted to a dipped beam of the type required, for example, in the United States of America and defined by the standard SAEJ 579 C.

In order to satisfy this standard, the cutoff profile is approximately defined on a standardized screen by two horizontal half-lines situated on either side of the headlight axis, with the right-hand half-line being at horizon level and with the left-hand half-line being offset below the horizon by about 1.5%. In addition, the specified region of maximum illumination is offset to the right from the axis of the headlight.

Beams meeting such standards are generally obtained by means of a headlight comprising a lamp having a transverse filament and co-operating with a parabolic mirror or reflector having a relatively long focal length, so as to reduce the height of the beam and thus minimize the amount of thickening required in the closure glass to create light-deflecting prisms.

Proposals have also been made for headlights having a lamp with an axial filament which is focused in a parabolic reflector wich is tilted downwardly to reduce the amount of deflection required of the prisms in the closure glass, thereby reducing the required thickness of glass. Above-mentioned U.S. Pat. No. 3,858,040 describes examples of both types of headlight.

However, in both of the embodiments described in said patent, it is necessary to use a parabolic reflector having a long focal length of about 29 mm to 32 mm, which therefore collects relatively little flux.

In order to remedy this low light yield, Cibie has proposed in its U.S. patent application No. 067,432 of June 25, 1987, a continuation of U.S. Application 755,070 of July 15, 1985 entitled "Dipped headlight for Motor Vehicle", a headlight having a reflector which is complex in shape and suitable for forming images of the filament below a cutoff line which extends generally horizontally, which enables short focal lengths to be used, and which consequently collects a much greater amount of flux. More precisely, such a headlight comprises an axial filament lamp emitting light freely in all directions about the filament, a reflector having an axis extending beneath the axis of the filament and parallel thereto, said reflector having a surface without discontinuity, and a closure glass placed in front of the reflector and suitable for spreading said beam in a horizontal direction. However, regardless of the practical embodiment of said headlight, the mirror must be turned to the right in order to obtain the required rightwards offset of the bright spot.

Unfortunately, it is generally undesirable to turn a mirror in this way, and in particular such turning constitutes a major obstacle in the implementation of headlights comprising two mirrors which are injected as a single part. One such headlight is shown diagrammatically in horizontal section in FIG. 1. It comprises a one-piece reflector 10 comprising a first mirror 10*a* for the dipped beam with an axis 12*a* which is offset to the right (downwards in the figure) by an angle δ, and a second mirror 10*b* for the high beam which is integral with the first and whose axis 12*b* extends straight ahead.

The unmolding of such a two-part mirror is hindered by the fact that the dipped beam and main beam lamps 14*a* and 14*b* are received by supporting collars 13*a* and 13*b* which necessarily extend along the above-mentioned axes 12*a* and 12*b*, which means that they cannot be unmolded along the same unmolding axis. It is therefore necessary to use a mold of special design for making such a two-mirror headlight, and in particular the mold requires slides which are expensive and difficult to implement.

Another drawback in implementing the above-mentioned patent application lies in the fact that the tilting to be given to the dipped beam reflector is a function of the focal length used and of the optical characteristics of the closure glass. More precisely, the reflector must be turned sideways through an angle corresponding to one half of the angular width of the images that contribute to the bright spot. Unfortunately, the width of these images depends on the size of the zones in the closure glass which are used for light-concentration purposes, as well as on the focal length of the reflector, and these parameters are a function of the space available in the vehicle for housing the dipped headlight, and more generally on the design requirements of the vehicle.

The present invention seeks in particular to avoid the unmolding problem by providing a dipped headlight which does not require its axis to be turned to the right in order to obtain an offset concentration spot. The filament, and thus the lamp, therefore remains parallel to the road axis and a two-mirror headlight including such a dipped headlight can easily be made at moderate expense with both mirrors being unmolded along the same axis.

SUMMARY OF THE INVENTION

The present invention provides a dipped headlight for a motor vehicle, capable of generating a dipped beam situated beneath a generally horizontal cutoff, the headlight being of the type comprising a lamp having an axial filament emitting light freely in all directions thereabout, a reflector having an axis (Ox) extending beneath the axis of the filament and parallel thereto, said reflector including a surface without discontinuity, and said headlight further including a closure glass placed in front of the reflector and suitable for spreading said beam in a horizontal direction, said headlight including the improvement whereby the reflector includes two diametrically opposite first quadrants whose surfaces are at least approximately two portions of paraboloids each having a focus situated in the vicinity of a respective axial end of the filament in order to generate filament images which provide light concentration situated beneath the cutoff and offset sideways relative to the headlight axis, with the other two quadrants being constituted by surfacees providing smooth and continuous transitions between said first two quadrants and creating filament images which are situated for the most part below the cutoff.

BRIEF DESCRIPTION OF THE DRAWINGS

Embodiments of the invention are described by way of example with reference to the accompanying drawings, in which.

DESCRIPTION OF PREFERRED EMBODIMENT

Figure 1:
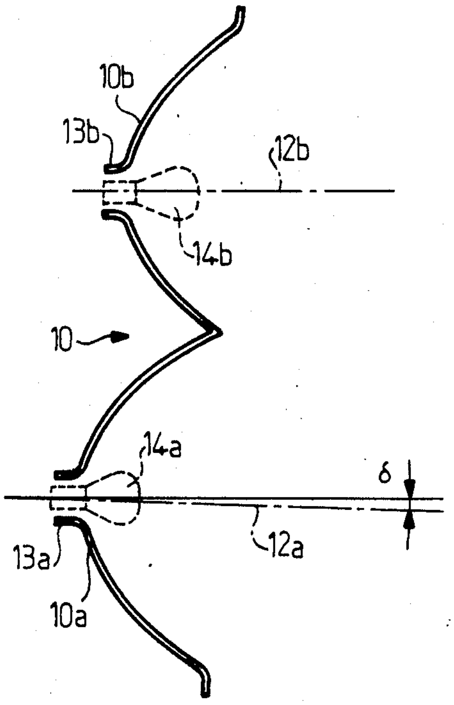
FIG-1 PRIOR ART
FIG. 1 is a diagrammatic horizontal section through a prior art two-mirror headlight.
Figure 2:
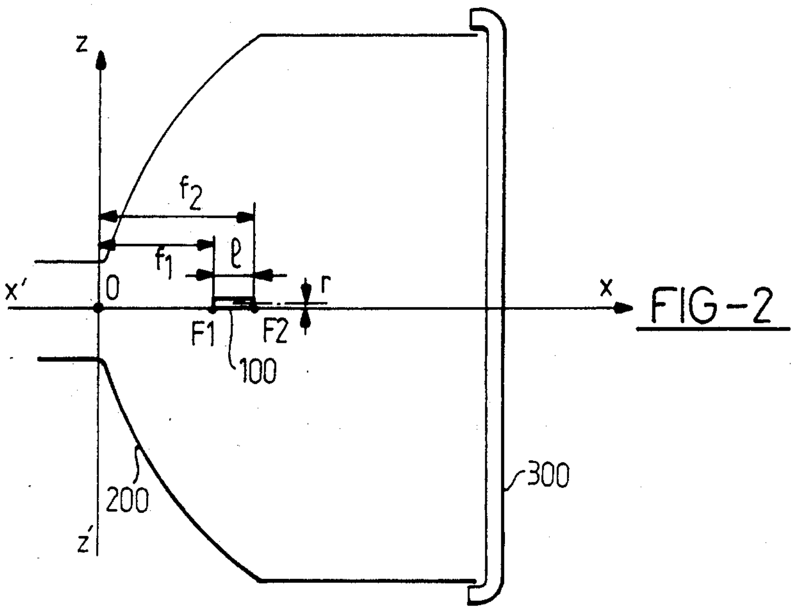
FIG. 2 is a diagrammatic longitudinal vertical section through a dipped headlight in accordance with the invention.
Figure 4:
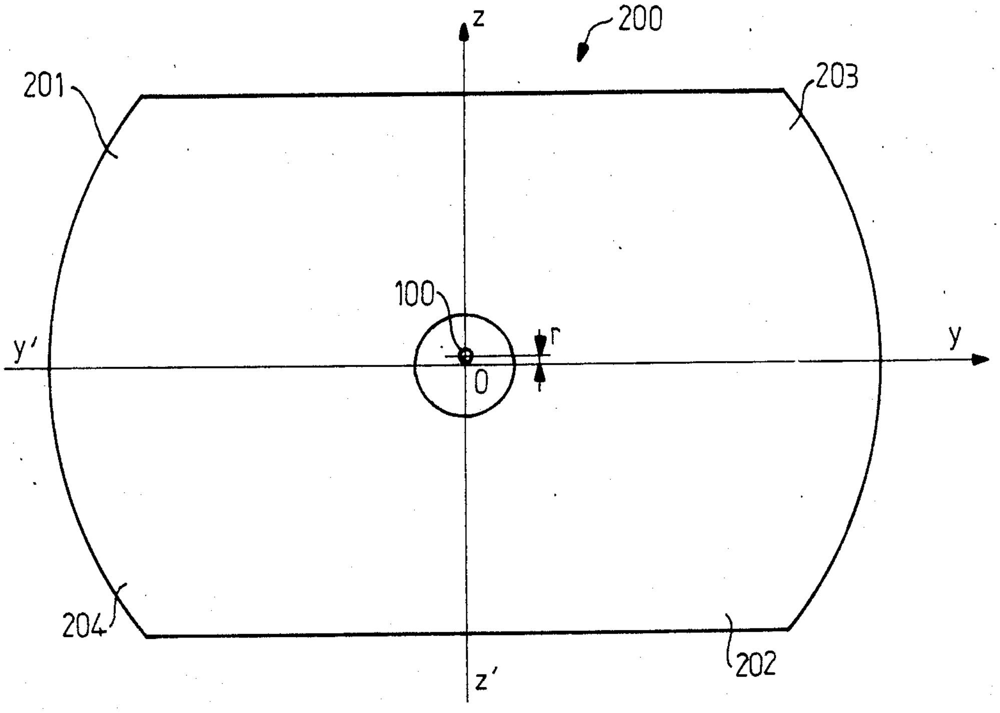
FIG. 4 is a diagrammatic back view of the headlight shown in FIGS. 2 and 3.
Figure 3:
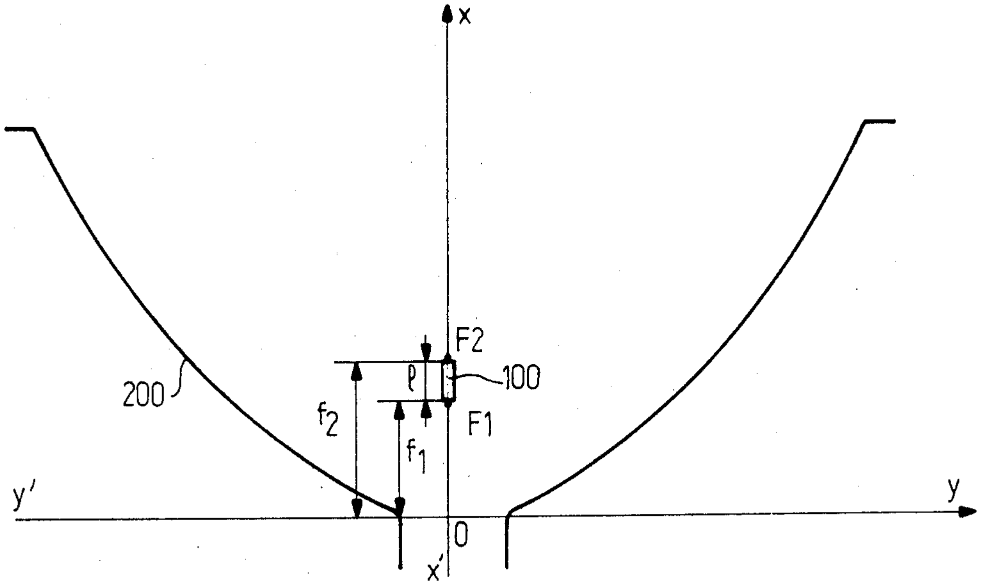
FIG. 3 is a diagrammatic horizontal section through the FIG. 2 headlight.
Figure 5:
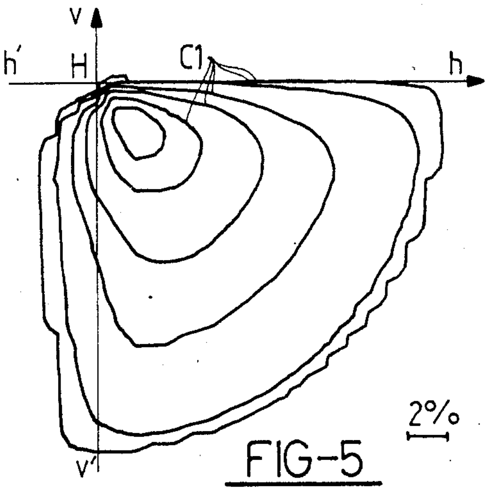
FIGS. 5 to 9 are isocandela curves on a screen obtained using the reflector of the headlight shown in FIGS. 2 to 4.
Figure 6:
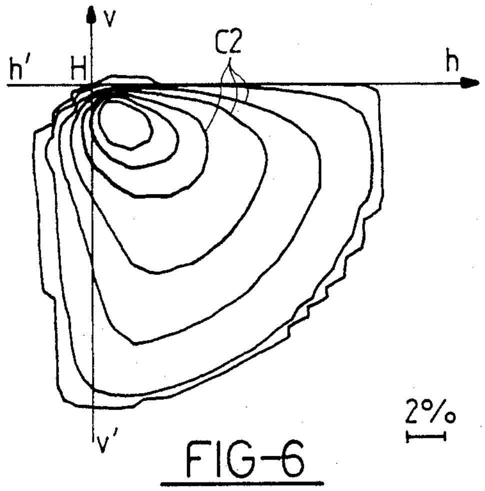

A headlight in accordance with the invention as shown diagrammatically in FIGS. 2 to 4 comprises a lamp having an axial cylindrical filament 100 of length l and of radius r, a reflector or mirror 200, and a distribution glass 300 for closing the headlight.

The axis of the filament 100 does not lie on the axis Ox of the reflector, but is upwardly offset by a distance equal to its radius r. In this way, the bottom of the light-emitting surface of the filament is tangential to said axis Ox.

The surface of the reflector is a surface without discontinuity and it is designed in such a manner as to form images of a filament which are for the most part situated below a horizontal plane, and as explained below, have their top-most points situated on said horizontal plane or in the immediate vicinity thereof. The surface of the reflector is also designed so that the bright spot obtained from the reflector is offset to the right (or to the left for vehicles driving on the left side of the road) relative to the road axis.

The term "absence of discontinuity" is used to specify that second order continuity is ensured, in other words that at any point along any line drawn on the surface, the tangent planes on either side of the line are the same. Such a surface therefore has no break therein. In practice, this disposition means that real surfaces can be manufactured which come very close to matching the theoretical design surfaces, thereby avoiding defects specific to certain prior art mirrors including offset paraboloids. In particular, such continuity means that the reflector can be made by stamping.

As can be seen in FIG. 4, the reflector is divided into four zones or sectors 201 to 204 which are mathematically defined below, with the above-mentioned continuity being ensured, in particular, at the interfaces between said sectors. These four sectors are separated from one another by a horizontal plane xOy and by a vertical plane xOz, and thus each sector occupies one quadrant. Although the quadrants shown in FIG. 4 are exact, the term "quadrant" is used in the present specification and claims to designate any sector which is delimited by two planes, one of which is substantially vertical and the other of which is substantially horizontal.

The surfaces of the quadrants 201 and 202 are designed to provide filament images which create a concentration spot which is offset downwardly and to the right relative to the axis Ox.

The surfaces of the quadrants 203 and 204 are designed to provide transitions with the above-mentioned continuity between the quadrants 201 and 202, and to generate filament images which are all adjacent to the axis of the headlight but which are for the most part below the horizontal plane passing through said axis. In particular, the centers of all these images are situated below said plane.

Theoretical calculation shows that surfaces having the above-mentioned properties include, amongst others, surfaces which satisfy the following equations given with respect to an orthogonal frame of reference [O,x-,y,z] as shown:

for the quadrant 201:

$$x=y^2/4f_1+z^2/4f_1$$

i.e. a paraboloid having a focal length $f_1$ and a focus $F_1$ which is situated approximately at the axially rear end of the filament 100 (as can be seen in FIG. 2, with the "rear" end of the filament being its end closest to the coordinate origin O);

for the quadrant 202:

$$x=y^2/4f_2+z^2/4f_2$$

i.e. another paraboloid having a focal length $f_2$ and having its focus $F_2$ situated approximately at the axially front end of the filament 100 (i.e. its end furthest from the coordinate origin);

for the quadrant 203;

$$x=y^2/4f_2+z^2/4(f_2-P)$$

with $$P=\Delta f/(1+y^2/4f_2^2)$$

and for the quadrant 204:

$$x=y^2/4f_1+z^2/4(f_1+Q)$$

with $$Q=\Delta f/(1+y^2/4f_1^2)$$

In these last two equations $\Delta f$ is equal to the difference $f_2-f_1$ and is approximately equal to the length l of the filament.

It can be shown by complex mathematical calculation which it would be superfluous to reproduce here, that at each of their ends the surfaces of the quadrants 203 and 204 lie on the parabolic curves focused on $F_1$ and $F_2$ of the surfaces 201 and 202, and that they provide smooth transitions therewith, i.e. transitions with the above-mentioned second order continuity.

FIGS. 5 to 8 are plots on a screen of isocandela curves $C_1$ to $C_4$ corresponding to the illumination provided by each of the quadrants 201 to 204 of the reflector 200 shown in FIGS. 2 to 4 and in the absence of a closure glass. As mentioned above, the quadrant 201 produces a concentration spot which is offset downwardly and to the right relative to the reference center H of the screen (i.e. the point of intersection between said screen and the axis Ox of the headlight), as does the quadrant 202. As can be seen in these plots, the offset concentration spot begins the right-hand half-cutoff of the dipped beam.

Figure 7:
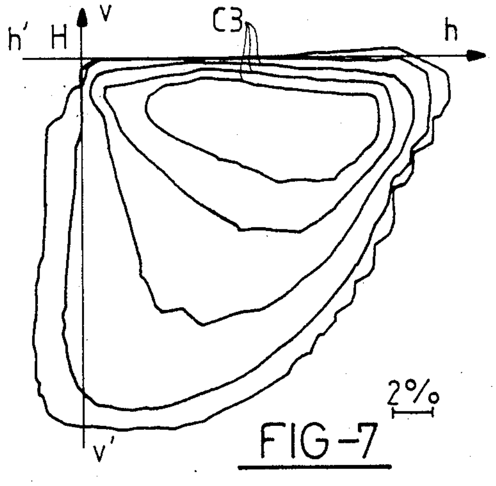
Figure 8:
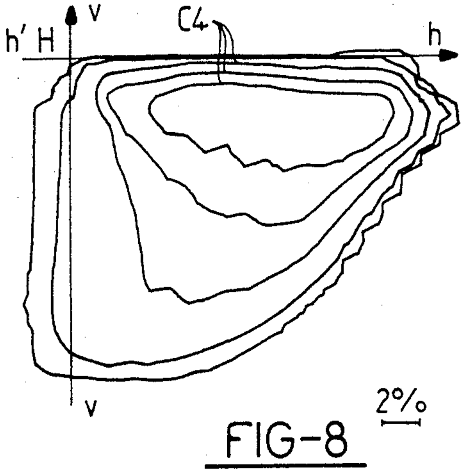

It can also be seen in FIGS. 7 and 8 that the illumination produced by the quadrants 203 and 204 extends said half cutoff as begun by the zones 201 and 202 to the right and with a sharp edge.

Figure 9:
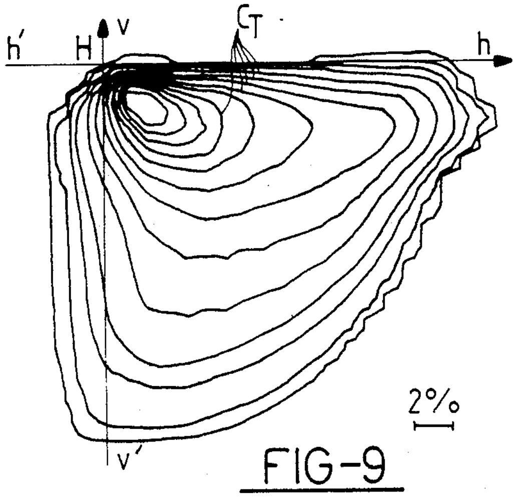

The overall light distribution obtained by superposing the illumination of each of FIGS. 5 to 8 is shown in FIG. 9 which is a plot of isocandela curves $C_T$ on the projection screen.

Figure 10:
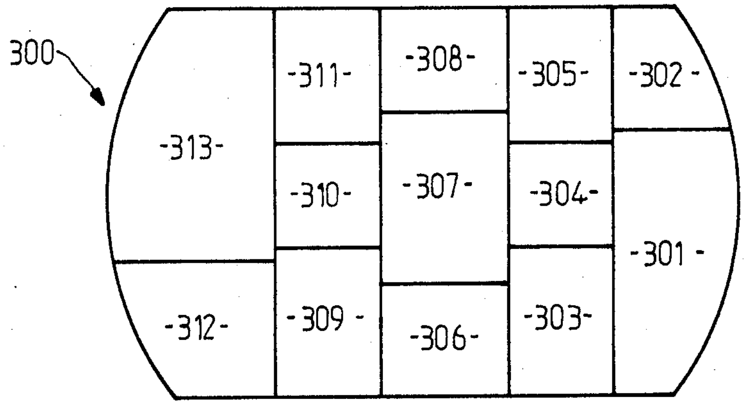
FIG. 10 is a diagrammatic front view of a preferred closure glass for said headlight.

FIG. 10 is a front view of one possible embodiment of a closure glass which is particularly well suited to the above-described mirror 200. It has thirteen zones 301 to 313 disposed as shown. The zones 301 and 313 correspond to major portions of the surfaces of the quadrants 203 and 204 respectively of the mirror. These zones are non-deflecting or substantially non-deflecting, so as to avoid spoiling the formation of the right-hand cutoff and the bright spot of the beam.

The central zones 306, 307 and 308 are suitable for providing considerable horizontal deflection, in particular to give the beam the large width which is required.

The remaining zones of the glass 300 provide medium horizontal deflection, in particular in order to increase illumination to the left and to begin the corresponding half cutoff and to extend the right-hand cutoff as begun by the portion of the beam passing through the zones 301 and 313.

As mentioned above, the axis of the filament and thus of the lamp in said dipped headlight is accurately parallel to the road axis. It is therefore easy to associate this dipped headlight with a main beam headlight in the form of a single block including a two-mirror reflector. Since the axis of the lamp for a main beam headlight is preferably parallel to the road axis, the collars on both mirrors are parallel, thereby enabling the two-mirror reflector to be made in a particularly simple molding operation that does not give rise to difficulties in unmolding.

However, in a variant embodiment (not shown) it is possible to tilt the mirror downwardly with the images offset in this way then being appropriately raised by deflector prisms in the closure glass. Such beam-raising prisms have surface discontinuities which tend to deflect light strongly downwardly unlike conventionally used beam lowering prisms in which the surface discontinuities tend to deflect light strongly upwardly. In other words, the inevitable light spill from a beam-lowering prism glass tends to dazzle oncoming drivers, whereas the inevitable light spill from a beam-raising prism glass is harmlessly lost on the road.

When such an inclined axis headlight is a part of a combined main beam and dipped beam two-mirror headlight, it is clear that in order to retain the advantage of unmolding along two parallel axes, the axis of the main beam mirror must also be tilted downwardly through the same angle. In order to compensate for this angular offset, which would normally give rise to a corresponding offset of the zone of maximum light intensity of the main beam, the filament of the main beam lamp is offset downwardly perpendicularly to the axis of its mirror in such a manner as to raise said zone of maximum intensity so as to situate it properly on the road axis. During this vertical compensation shift, the focus/filament relationship in the axial direction remains unchanged, since the center of the filament is vertically below the focus.

By way of example, such a vertical shift may be about 0.5 mm for a parabolic mirror having a focal length of 22.5 mm.

In a variant embodiment of the invention, the mirror 200 while still being constituted by four quadrants of substantially identical dimensions may be defined by the following equations:

for the quadrant 201:

$$x=y^2/4f_{14}+z^2/4(f_{14}-R)$$

with $$R=(f_{14}-f_{13})/(1+y^2/4f_{14}^2)$$

for the quadrant 202:

$$x=y^2/4f_{23}+z^2/4(f_{23}-S)$$

with $$S=(f_{23}-f_{24})/(1+y^2/4f_{23}^2)$$

for the quadrant 203:

$$x=y^2/4f_{23}+z^2/4(f_{23}-T)$$

with $$T=(f_{23}-f_{13})/(1+y^2/4f_{23}^2)$$

for the quadrant 204:

$$x=y^2/4f_{14}+z^2/4(f_{14}-U)$$

with $$U=(f_{14}-f_{24})/(1+y^2/4f_{14}^2)$$

In these equations $f_{14}$ and $f_{13}$ are focal lengths corresponding to two distinct focuses situated close to the end of the filament which is closest to he co-ordinate origin, and $f_{23}$ and $f_{24}$ are focal lengths corresponding to two distinct focuses situated in the vicinity of the end of the filament which is furthest from the co-ordinate origin.

Each of the above-defined surfaces provides a continuous transition between the adjacent surfaces, and continuity is also ensured at the joins where the surfaces meet in pairs.

Surfaces such as those defined above enable the positions of the filament images to be finely optimized relative to one another and relative to the reference axis by making use of four different focal lengths for the parabolic interface curves between the four quadrants, thereby providing greater flexibility in the implementation of the closure glass.

The general concepts of the invention can be implemented using reflectors which are not very tall, by virtue of the particularly high light yield which is otained. In particular, the invention can be used to provide headlights whose maximum height does not exceed 70 mm, using focal lengths $f_1$ and $f_2$ (in the first embodiment, for example) which are respectively equal to 20 mm and to 25 mm.

Naturally, the present invention is not limited to the embodiments described above. In particular, for traffic drive on the left-hand side of the road, the person skilled in the art will be perfectly capable of making the necessary symmetrical changes relative to the above description.

What is claimed:

1. A dipped headlight for a motor vehicle, capable of generating a dipped beam situated beneath a generally horizontal cutoff, the headlight being of the type comprising a lamp having an axial filament emitting light freely in all directions thereabout, a reflector having an axis (Ox) extending beneath the axis of the filament and parallel thereto, said reflector including a surface without discontinuity, and said headlight further including a closure glass placed in front of the reflector and suitable for spreading said beam in a horizontal direction, said headlight including the improvement whereby the reflector includes two diametrically opposite first quadrants bounded by approximately vertical and horizontal axial planes and whose surfaces are at least approximately two portions of paraboloids having focuses situated respectively in the vicinity rear and front axial ends of the filament in order to generate filament images which provide light concentration situated beneath the cutoff and offset sideways relative to the headlight axis, with the other two quadrants also being bounded by said approximately vertical and horizontal planes and being constituted by surfaces providing smooth and continuous transitions between said first two quadrants and creating filament images which are situated for the most part below the cutoff.

2. A headlight according to claim 1, wherein the filament is cylindrical and is offset upwardly from the axis (Ox) of the reflector by a distance equal to its own radius.

3. A headlight according to claim 1, wherein the first two quadrants are surfaces defined by the respective ones of the following equations:

$$x=y^2/4f_1+z^2/4f_1,$$

and $$x=y^2/4f_2+z^2/4f_2$$

and wherein the second two quadrants are surfaces defined by respective ones of the following equations:

$$x=y^2/4f_2+z^2/4(f_2-P)$$

with $$P=\Delta f/(1+y^2/4f_2^2)$$

and $$x=y^2/4f_1+z^2/4(f_1+Q)$$

with $$Q=\Delta f/(1+y^2/4f_1^2)$$

where $f_1$ and $f_2$ are the focal lengths of said paraboloids and where $\Delta f$ is approximately equal to the length of the filament.

4. A headlight according to claim 1, wherein the first two quadrants are surfaces defined by respective ones of the following equations:

$$x=y^2/4f_{14}+z^2/4(f_{14}-R)$$

with $$R=(f_{14}-f_{13})/(1+y^2/4f_{14}^2)$$

$$x=y^2/4f_{23}+z^2/4(f_{23}-S)$$

with $$S=(f_{23}-f_{24})/(1+y^2/4f_{23}^2)$$

and wherein the second two quadrants are surfaces defined by respective ones of the equations:

$$x=y^2/4f_{23}+z^2/4(f_{23}-T)$$

with $$T=(f_{23}-f_{13})/(1+y^2/4f_{23}^2)$$

$$x=y^2/4f_{14}+z^2/4(f_{14}-U)$$

with $$U=(f_{14}-f_{24})/(1+y^2/4f_{14}^2)$$

where $f_{14}$ and $f_{23}$ are the distances between the apex of the reflector and first focuses close to a first end of said filament and where $f_{13}$ and $f_{24}$ are the distances between the apex of the reflector and second focuses close to the other end of said filament.

5. A headlight according to claim 1, wherein the closure glass includes two zones which correspond to respective large portions of the surfaces of the second quadrants and which are non-deflecting zones or are substantially non-deflecting zones.

* * * * *